United States Patent [19]

Frankel

[11] Patent Number: 4,740,682

[45] Date of Patent: Apr. 26, 1988

[54] OPTICAL TRACKING, FOCUSING, AND INFORMATION RECEIVING DEVICE INCLUDING A PYRAMIDAL LIGHT SPLITTER

[76] Inventor: Michael Frankel, 3703 Brownbrook Ct., Randallstown, Md. 21133

[21] Appl. No.: 888,392

[22] Filed: Jul. 23, 1986

[51] Int. Cl.$^4$ .............................................. G01J 1/20
[52] U.S. Cl. ................................. 250/203 R; 356/152
[58] Field of Search ............................... 356/141, 152; 250/203 R; 350/170, 169, 500; 244/3.16

[56] References Cited

U.S. PATENT DOCUMENTS 3,478,219  11/1969  Nutz ..................................... 250/220
4,225,781   9/1980  Hammons ........................ 250/203 S

FOREIGN PATENT DOCUMENTS 678465  8/1979  U.S.S.R. .

Primary Examiner—David C. Nelms
Assistant Examiner—Jessie Ruoff
Attorney, Agent, or Firm—Laurence R. Brown; Alfred J. Mangels

[57] ABSTRACT

A precision optical tracking, stabilization, focusing, and information receiving system is described. This invention is designed to improve optical systems in two important areas. The first application is in systems that require both reception of information and target tracking using a single beam. A transparent pyramid with a truncated vertex (frustum of a pyramid) is used to split a beam into 5 parts. The central axial part is used as an information carrier, and the other four are used for tracking. The second application is for precise focusing. The light beam is focused onto the vertex of a frustum of a pyramid and the intensity of the central fraction of the beam, as compared with the side fractions, decreases as the focal point is moved away from the surface of the pyramid in either direction.

13 Claims, 3 Drawing Sheets

OPTICAL TRACKING, FOCUSING, AND INFORMATION RECEIVING DEVICE INCLUDING A PYRAMIDAL LIGHT SPLITTER

CROSS REFERENCES TO RELATED APPLICATIONS

Field of Search: 250/203 R; 350/500; 244/3.16.

U.S.S.R. Inventor's Certificate No. 678,465 to Vasilyev et al, Aug. 5, 1979.

BACKGROUND OF THE INVENTION

1. Field of the Invention

This invention relates generally to the use of a beam splitter for tracking and stabilizing light targets.

2. Description of the Prior Art

Various systems for the detection of the departure of a tracked point light target from the axis going through the center of the tracking system, and for the collection of information carried by the light, are known in the prior art. These systems either lack focusing capability, the ability to track faint light targets, or are very complex and difficult to realize and maintain. These problems are overcome by this invention.

SUMMARY OF THE INVENTION

A precision optical tracking, stabilizing, focusing, and information receiving system is described. This invention presents an improvement over prior art systems by utilizing a truncated transparent pyramid to split the beam from the light target into five components. By being transmitting rather than reflecting, the energy losses are minimized, allowing the system to work with extremely weak light beams with diameters on the order of several micrometers. It is an object of this invention to provide a highly reliable and inexpensive tracking system. Another object of this invention is to provide an image stabilization system. Another object of this invention is to aid in precise focusing of optical devices. Another object of this invention is to allow a single light beam to be used simultaneously for tracking and information reception. Other objects of this invention will become apparent upon the study of the following drawings and the preferred embodiment description.

DESCRIPTION OF THE PREFERRED EMBODIMENT

Figure 1:
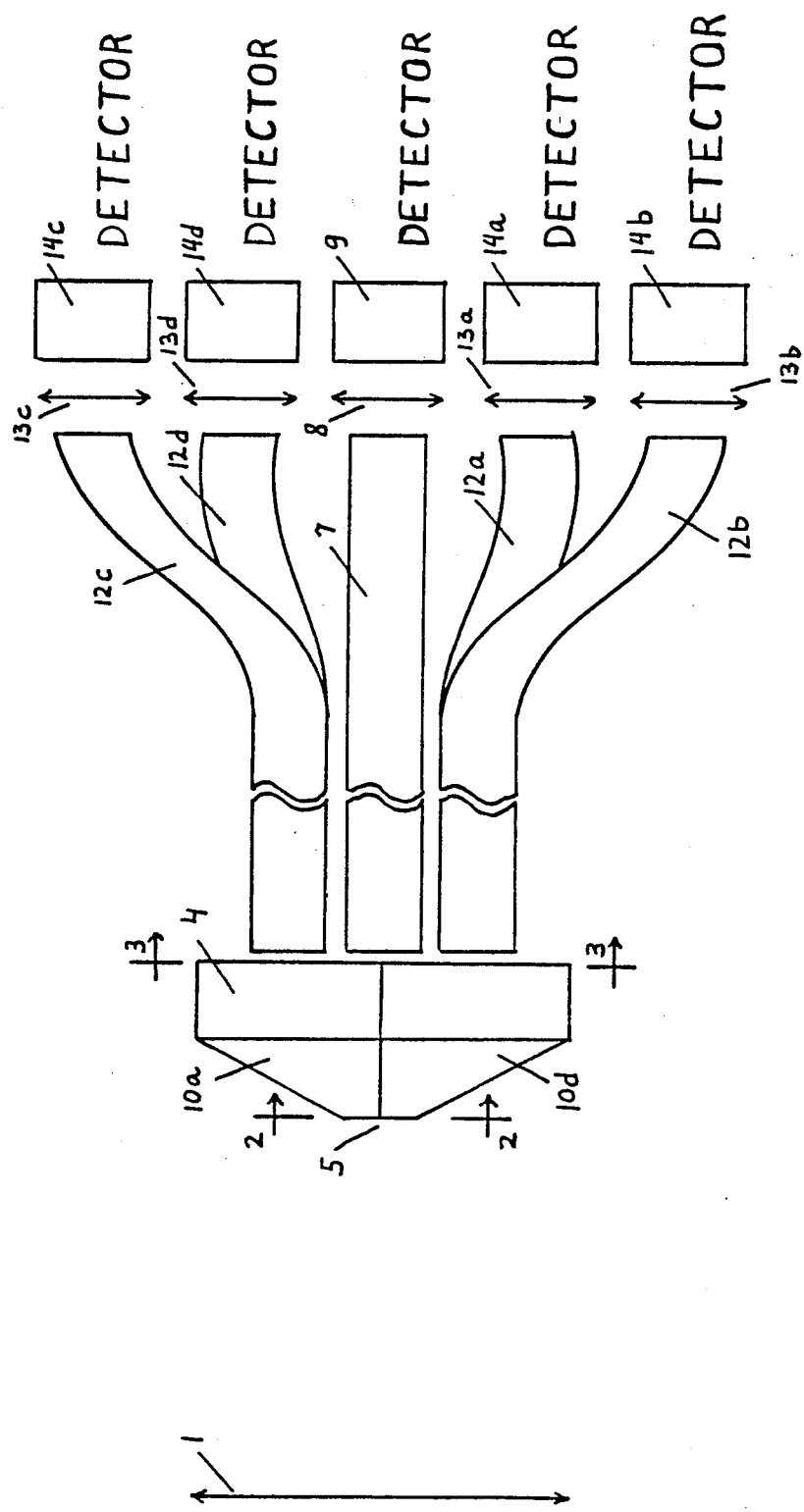
FIG. 1 is a representation of the preferred embodiment.
Figure 2A:
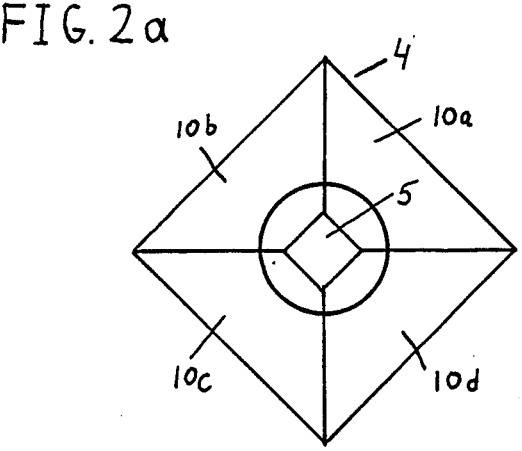
FIG. 2a is a sectional view, along line 2—2 of FIG. 1, with a perfectly centered light beam from the target.
Figure 3A:
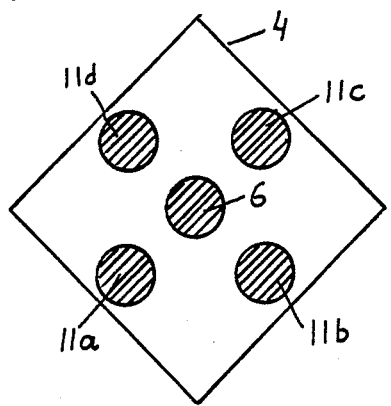
FIG. 3a is a sectional view, along line 3—3 of FIG. 1, with a perfectly centered light beam from the target.
Figure 2B:
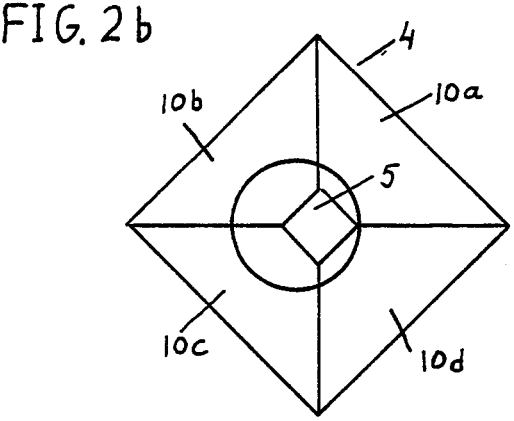
FIG. 2b is a sectional view, along line 2—2 of FIG. 1, with a light beam from the target shifted along the axis.
Figure 3B:
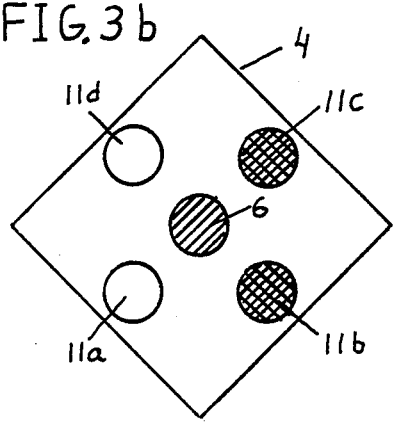
FIG. 3b is a sectional view, along line 3—3 of FIG. 1, with a light beam from the target shifted along the axis.
Figure 2C:
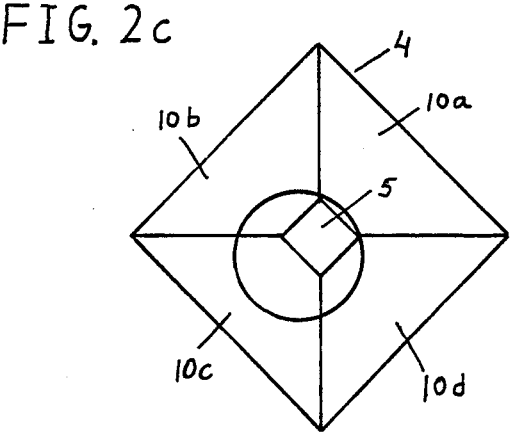
FIG. 2c is a sectional view, along line 2—2 of FIG. 1, with a light beam from the target shifted along the diagonal.
Figure 3C:
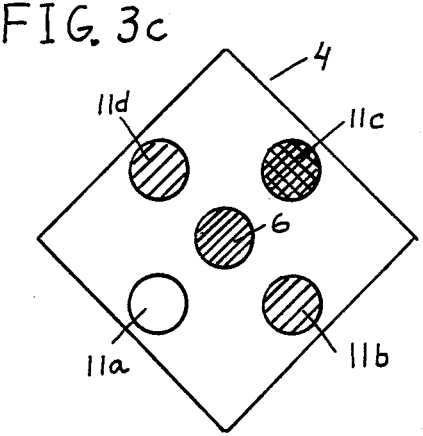
FIG. 3c is a sectional view, along line 3—3 of FIG. 1, with a light beam from the target shifted along the diagonal.
Figure 4:
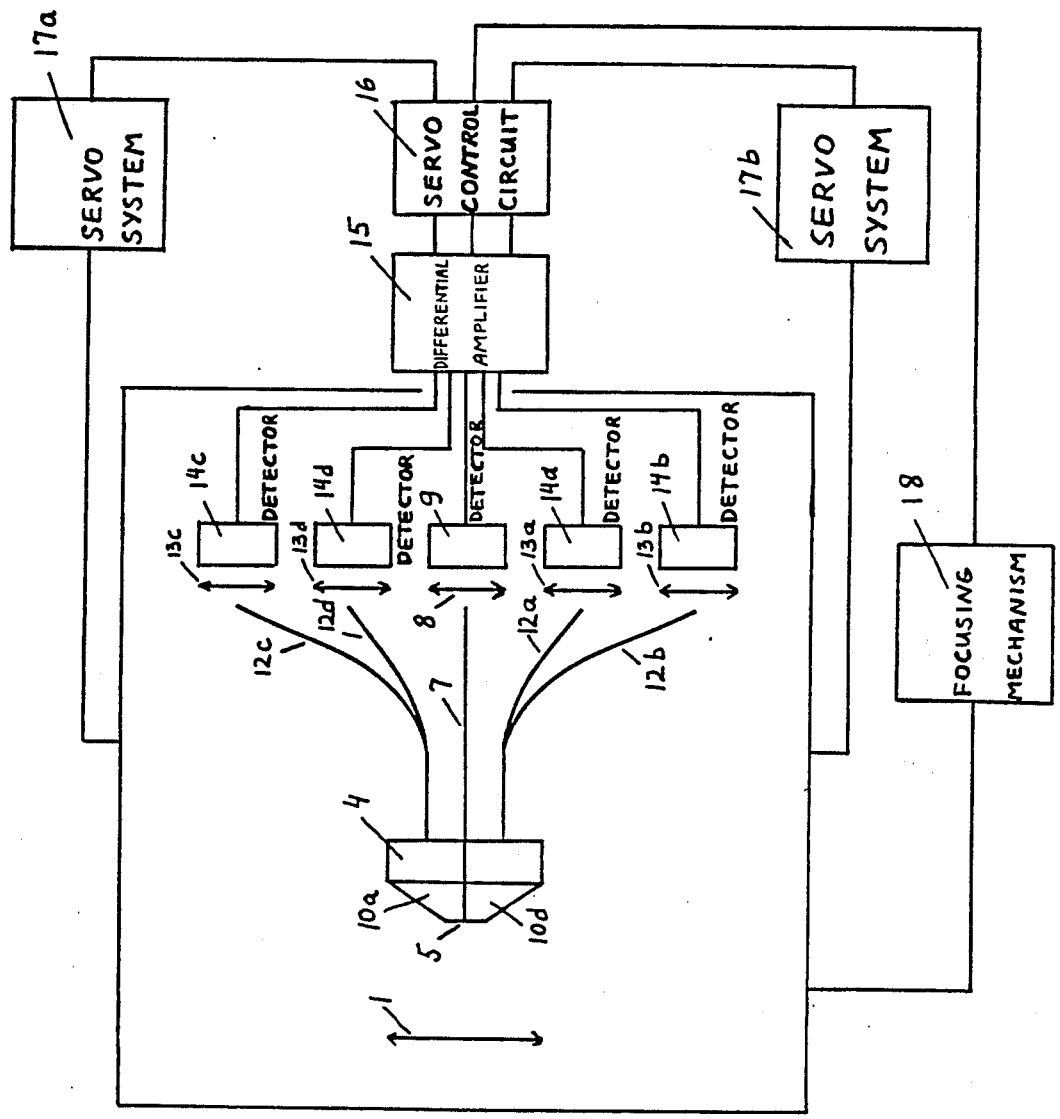
FIG. 4 is a schematic diagram of the tracking and focusing system.

Referring to FIGS. 1, 2a, 2b, 2c, 3a, 3b, 3c, and 4 the optical system in accordance with the present invention operates as follows. A light beam from the light point target passes through converging lens 1 and is incident onto the flat face 5 and onto inclined, planar surface 10a, 10b, 10c, and 10d of the transparent truncated pyramid 4. The fraction of the beam that is incident onto the flat face 5 is transmitted through pyramid 4 without deflection and emanates therefrom as beam 6 to enter fiber optic link 7. The light emitted from the fiber optic link 7 is focused by lens 8 onto a radiant energy detector 9. The fractions of the beam incident onto the inclined, planar surfaces 10a, 10b, 10c, and 10d are refracted relative to the straight path of the light that is incident to flat face 5 to come out of pyramid 4 as diverging beams 11a, 11b, 11c, and 11d. These beams are in turn fed into respective fiber optic links 12a, 12b, 12c, and 12d, which carry them through to respective lenses 13a, 13b, 13c, and 13d, which focus them onto respectives radiant energy detectors 14a, 14b, 14c, and 14d.

As the light point target moves relative to the above-described optical system, the light beam from the target shifts off the center of the pyramid 4 and the relative strengths of beam 11a, 11b, 11c, and 11d change, whereas their directions remain unaffected. The radiant energy detectors 14a, 14b, 14c, and 14d provide output signals that are proportional to the radiant energies of the respective beams 11a, 11b, 11c, and 11d, and, shown in FIG. 4, these signals are processed through a differential amplifier 15 and pass to servo controlling circuitry 16. The outputs of the servo controlling circuitry 16 are utilized to drive the servo systems 17a and 17b to enable them to reposition the optical system so that the light beam from the target is again centered on the flat face 5 of the pyramid, in effect making the optical system track the target.

The precise focusing is accomplished by utilizing the fact that the proportion of the central fraction 6 of the beam to the sum of the other four fractions 11a, 11b, 11c, and 11d is at maximum when the flat face 5 of the pyramid 4 is in the focal plane. As the focus shifts, due to inherent system fluctuations or for other reasons, the radiant energy falling onto the detector 9 decreases, whereas the sum of the radiant energies falling onto detectors 14a, 14b, 14c, and 14d increases. The signals are fed into the amplifier 15 and then to servo controlling circuitry 16, which drives a focusing mechanism 18.

It is therefore apparent to those skilled in the art that the optical system described herein is capable of optical tracking, stabilization, focusing and information receiving. For example, in single light beam optical systems that require both information reception and light target tracking, the light beam is divided into five parts, a central axial part and four additional parts provided by directing the light beam onto the truncated vertex of a transparent pyramid. The central axial part can be used as an information carrier and the four additional parts for tracking. Similarly, the disclosed optical system can also be used for precise focusing of a light beam by directing the light beam onto the truncated vertex of a frustum of a transparent pyramid. In that application the intensity of the central fraction of the beam that issues from the pyramid is compared with the intensities of the side fractions to permit adjustment of the focal point relative to the pyramid.

Although one embodiment of the present invention has been illustrated and described in detail, other embodiments of the invention which function in a similar manner are contemplated. As an example, this invention may be used for simultaneous tracking/stabilization and information reception as follows. The four light fractions 11a, 11b, 11c, and 11d refracted by the respective inclined planar surfaces 10a, 10b, 10c, and 10d of the pyramid are used for tracking and stabilization of the target as described previously. The central light fraction 6 is transmitted through to the information gathering device, such as a spectrum analyzer, demodulator, etc.

I claim:

1. An optical tracking, focusing, and information receiving device comprising:
   (a) truncated transparent pyramid means positioned to receive a light beam and to refract and divide the beam into a plurality of individual output light beams, the pyramid means having an axis and including a first transverse planar surface perpendicular to the axis and a second transverse planar surface perpendicular to the axis and spaced axially from the first transverse planar surface, the second transverse planar surface having a greater area than the first transverse planar surface;
   (b) light receiving and transmitting means each positioned adjacent the second transverse planar surface for receiving the individual output light beams from the pyramid means and for conveying the respective individual output beams to receptor means; and
   (c) a plurality of receptor means for receiving an individual output beam from the light receiving and transmitting means and for providing an output signal representative of the intensity of the respective individual beams that impinge upon respective receptor means.

2. An optical device in accordance with claim 1, wherein the pyramid means includes inclined faces that are inclined relative to the axis and that intersect the respective first and second transverse planar surfaces, the inclined faces being inclined at substantially the same angle relative to the axis.

3. An optical device in accordance with claim 1, including lens means positioned between the light source means and the pyramid means.

4. An optical device in accordance with claim 3, wherein the lens means is a converging lens.

5. An optical device in accordance with claim 1, wherein the light receiving and transmitting means include optical fibers for receiving and transmitting respective individual output light beams.

6. An optical deviced in accordance with claim 5, wherein the optical fibers include a central fiber in a plurality of outwardly diverging outer fibers.

7. An optical device in accordance with claim 1, wherein the receptor means include radiant energy detectors for providing output signals proportional to the intensity of the respective individual beams.

8. An optical device in accordance with claim 1, including differential amplifier means for receiving the output signals from the receptor means and for providing an amplified output signal.

9. An optical device in accordance with claim 8, including servo controlling circuitry means responsive to the amplified output signal for providing control signals repositioning the optical system to a desired position.

10. An optical device in accordance with claim 9, including servo system means responsive to the control signals for repositioning the optical system to track the target.

11. An optical device in accordance with claim 10, including focus adjusting means for receiving control signal from the servo control circuit means and for shifting the optical system in response to a shift in the light source means.

12. A method of detecting the lateral shift of a light source from an initial position comprising:
   (a) providing a truncated transparent pyramid for receiving and transmitting an incoming light beam and for dividing the incoming beam into a plurality of outgoing light beams including a central outgoing beam and a plurality of outer outgoing light beams, the pyramid having a first planar surface facing the incoming light beam, a plurality of second planar surfaces inclined relative to the first planar surface and facing the incoming light beam for refracting light to define respective outer outgoing light beams, and a third planar surface through which each of the respective outgoing light beams pass;
   (b) tramsmitting the respective outgoing light beams to individual light receptors;
   (c) determining the relative intensities of the outgoing light beams received by the light receptors; and
   (d) adjusting the position of the transparent pyramid laterally relative to the incoming light beam until the respective intensities of the outer outgoing light beams are substantially equal.

13. A method of detecting the axial shift of a light source from an initial position comprising:
   (a) providing a truncated transparent pyramid for receiving and transmitting an incoming light beam and for dividing the incoming beam into a plurality of outgoing light beams including a central outgoing beam and a plurality of outer outgoing light beams, the pyramid having a first planar surface facing the incoming light beam, a plurality of second planar surfaces inclined relative to the first planar surface and facing the incoming light beam for refracting light to define respective outer outgoing light beams, and a third planar surface through which each of the outgoing light beams pass;
   (b) transmitting the respective outgoing light beams to individual light receptors;
   (c) determining the relative intensities of the outgoing light beams received by the light receptors; and
   (d) adjusting the position of the transparent pyramid axially relative to the incoming light beam until the intensity of the central outgoing light beam is at a maximum relative to the sum of the intensities of the outer outgoing light beams.

* * * * *